United States Patent Office 3,404,020
Patented Oct. 1, 1968

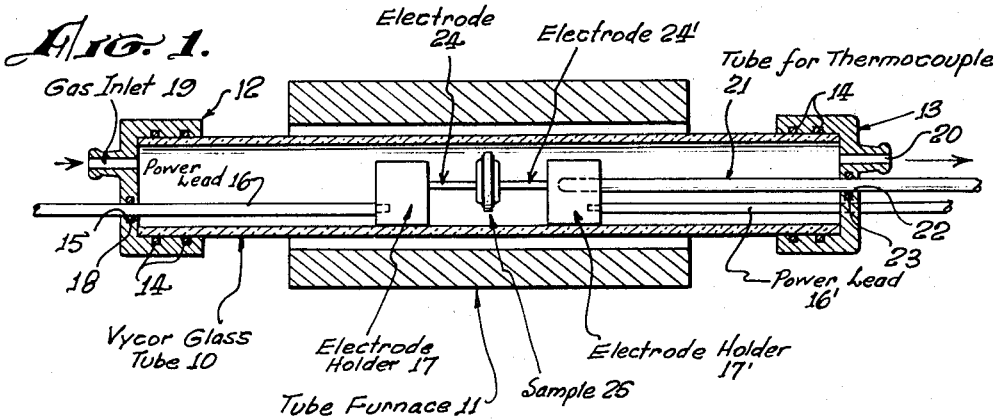
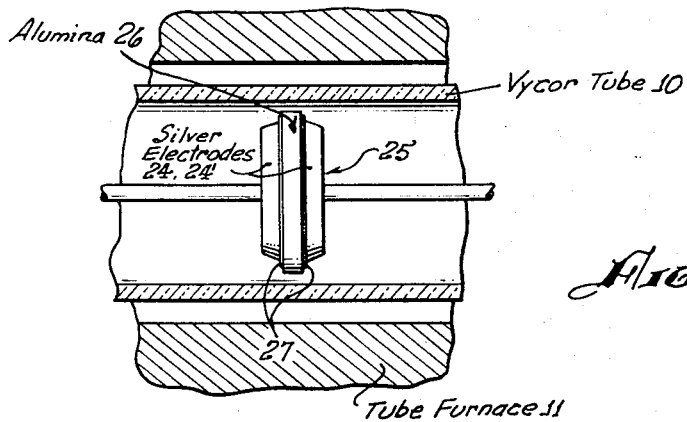
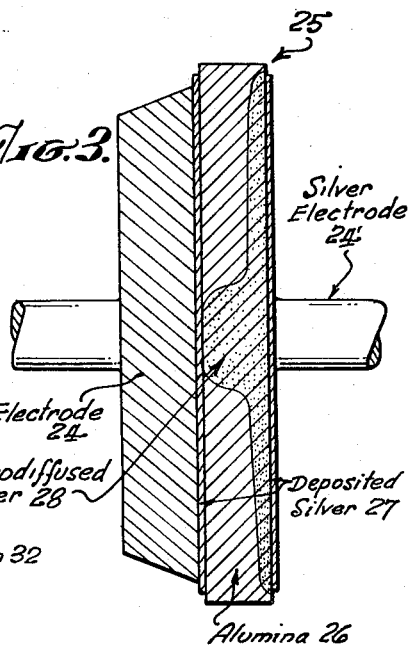
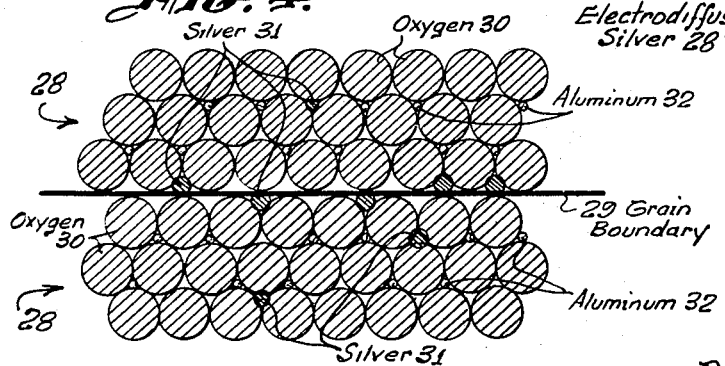

3,404,020
CERAMIC-TO-METAL BONDING METHOD
Donald D. Woolley, Ontario, Calif., assignor to General Dynamics Corporation, Pomona, Calif., a corporation of Delaware
Filed Dec. 23, 1964, Ser. No. 420,665
14 Claims. (Cl. 117—5.5)

ABSTRACT OF THE DISCLOSURE

A method and apparatus for electrodiffusion of a metal into a ceramic in order to improve the strength, brittleness, and thermal shock properties of the ceramic. A ceramic-metallic member is produced by electrodiffusion of a metal, such as silver, into the pore structure of a dense fine-grained, preformed ceramic body, such as alumina, by heating the ceramic coated with metal to a desired temperature and directing a desired voltage across same, and then cooling the thus produced ceramic-metallic material.

---

This invention relates to composite structural material, particularly to ceramic-to-metal bonding techniques, and more particularly to a method for incorporation of metal into ceramic bodies in order to improve strength, brittleness, and thermal shock properties of ceramics.

The production of composite structural materials, successfully incorporating the desirable features of both metallic and non-metallic phases, has been the desired objective of industry for over a decade. Powder metallurgical techniques of sintering, hot-pressing flame spraying and other methods have been employed.

High temperature applications are currently a major force in creating interest in materials research. Advances in aero-space technology have accelerated the search for refractory materials. Structures in dynamic high temperature applications are generally of superalloys. The brittleness factor has not generally allowed for the extensive use of ceramics except in static, near equilibrium situations. Somewhat over a decade ago a great deal of research effort developed around the concept of finding a material with the best properties of metals combined with the desirable high temperature strength of refractory ceramics. This gave rise to efforts to produce metal-composite bodies termed "cermets" or "ceramals."

The original concept involved in seeking a solution to the refractory materials problem through metal-ceramic composite bodies was that the resultant "cermet" should assume the favorable attributes of both of the original materials. That is, it would at once possess the characteristics of high strength, a very limited deformability at elevated temperatures common to ceramic materials, and yet exhibit ductile behavior and high thermal conductivity characteristic of metals. Hopefully these materials would be resistant to fracture both by thermal shock and by impact loading.

First attempts at production of cermets was by powder metallurgical techniques of sintering cold-pressed, compact bodies of fine metal and ceramic particles. These early efforts were not notably successful in solving the thermal shock problem; in fact, the vein of thought predominant in cermet literature is that in most, if not all cases, the result was a material which inherited the least desirable properties from the parent phases. In some cases failure could be traced to uncontrolled reactions of the cermet with the gaseous atmosphere. The latter were often simply combustion products of the heating media for the sintering furnaces. Continued effort has found a gradual improvement in the characteristics of cermet materials. However, undesirable brittle behavior still limits their application in some cases, while the continuous metal binder phase limits use of another type of cermet to temperatures below the melting point of the binder.

There are several ways by which the approach to refractoriness in materials can be made. One is to use the inherent temperature stability of the hard metals. This approach requires that the undesired brittleness factor be overcome, and much current metallurgical research is in this direction. Another method is to synthesize new compounds with the desired properties. This approach has been too difficult in the case of solids, although for thermally stable liquids and adhesives, considerable success has been achieved with this type of fundamental research. A third approach, the one upon which this invention is based, is to take advantage of the refractory properties of ceramic solids of the oxide type and attempt to modify their troublesome property of brittleness with little or no disturbance to the basic structure of the sintered solid.

The present invention, based upon the above stated third approach, utilizes an electrical field to cause diffusion of metal through dislocations and open pores in insulators and thus provides an electrodiffusion technique for forming a cermet from dense, high-purity ceramic and diffused metal. Also the diffused metal "electroplates" on one of the external metal electrodes, whether it is a film formed by any of several methods, e.g., flame spraying, or a block of metal in simple physical contact with the ceramic or insulator solid, thus "keying" it to the surface.

Therefore, it is an object of this invention to provide a ceramic-to-metal bonding method.

Another object of the invention is to provide a method of joining, by very strong permanent bonding, a metal and a non-metallic solid.

Another object of the invention is to provide a method for the incorporation of metal into ceramic bodies in order to improve strength, brittleness, and thermal shock properties of ceramics.

Another object of the invention is to provide an electrodiffusion method for forming a cermet from dense, high-purity alumina and diffused silver.

Other objects of the invention will become readily apparent from the following description and accompanying drawings wherein:

FIG. 1 is a view partially in cross-section which diagrammatically illustrates an apparatus for carrying out the method of the invention;

FIG. 2 is an enlarged view partially in cross-section diagrammatically illustrating a portion of the FIG. 1 apparatus;

FIG. 3 is an enlarged cross-sectional view of a modified electrode configuration illustrating the penetration of metal into an inorganic non-metallic material; and FIG. 4 is an enlarged cross-sectional view showing the grain boundary of the composite produced by the invention.

As set forth above this invention is based on the prior known approach of taking advantage of the refractory properties of ceramic solids of the oxide type by attempting to modify their troublesome property of brittleness with little or no disturbance to the basic structure of the sintered solid.

Liquid metal impregnation is one technique which in the past has been developed to implement this concept. The method of producing a cermet where only the metal phase of a composite is continuous, as mentioned above, has been found to increase strength beyond that of the metal but not at elevated temperatures where melting (or softening) is the serious limitation.

To increase the concentration of a metal in an intact solid requires either an impregnation or a diffusion process. The concept upon which this invention is based is the consideration of the results of basic research on diffusion in single crystals of alumina and quartz. In this prior work, which was concerned with bulk diffusion mechanisms, an experimental difficulty was the surface migration of silver atoms. It was thus reasoned that this negative aspect of this prior problem could be turned to advantage, if internal surfaces could be utilized to bond metal to ceramic or in filling pores of a ceramic with the migrating metal.

To carry out this concept the process of this invention was developed by which metal, introduced as either a continuous phase or atomically dispersed in a continuous phase ceramic body, could operate to strengthen a ceramic solid. Thus research was directed at producing a composite from a preformed polycrystalline ceramic body with a continuous three-dimensional metal phase present in its open pore structure. This was attempted by the provision of large electric fields in which ions may form and migrate through the solid, utilizing internal pore surfaces as diffusion paths through dense sintered oxide ceramics.

The term "cermet" at present encompasses a wide variety of materials. Generally these have in common the presence of at least two phases: a metal, and an inorganic, non-metallic material which is generally considered to be inherently of a brittle nature. The non-metal may be an oxide, silicide, boride, carbide, etc., while the metal may be unalloyed (pure), e.g., nickel, iron, chromium, etc., or may be an alloy such as nickel-molybdenum, stainless steel, or any other suitable combination. Usual production practice involves the sintering of compacted mixtures of powders of the two phases. As previously indicated, the chief reasons for the development of cermet have been the need for higher strength at elevated temperatures such as we find in ceramics, and good impact resistance and thermal shock resistance generally characteristic of metals. To achieve the first of these characteristics, high strength, it is generally recognized that high density bodies are desirable. The quest for greater densities has required judicial selection of compatible phases of metal and non-metal. To aid the sintering process and promote shrinkage and densification, the metal must "wet" the ceramic surfaces. Wetting is accomplished through either of two processes: using a metal whose oxide has a structure similar to that of the ceramic (or which forms an intermediate product at the metal ceramic interface which is firmly adherent to both phases), or selecting a metal which is soluble in or dissolves the ceramic. The latter is more often the case for carbides, while the former prevails for oxide base cermets.

The introduction of metal into a preformed ceramic body can serve to strengthen such bodies by: (1) densification, or the increase in the number of bonds contributing to the forces of cohesion; (2) surface effects in covering internal and external surfaces, by reducing slip of the ceramic, and by inhibiting atmospheric effects; (3) metal fiber (whisker) reinforcement to aid in sustaining high local stresses which otherwise initiate cracking; and (4) grain boundary reinforcement which increases cohesive strength at normally weaker points of a sintered solid.

As pointed out above, it is an object of this invention to make a cermet body using dense fine-grained, preformed ceramic bodies and pure metal, thus avoiding the complication of compound formation. Metal is incorporated in the pore structure of the solid utilizing electrodiffusion.

Based on the concept of the invention it was determined that it was possible to form cermets such as silver-alumina composites. Alumina was determined to be compatible with silver as the metal phase since no known chemical interaction occurs. In addition very small pore size and high initial density of the ceramic was found to be desirable. A dense, pure alumina body was obtained in the form of $\frac{1}{10}''$ x $\frac{7}{8}''$ x $1\frac{7}{8}''$ bars. In fabricating, these were cut from large bar stock, pre-fired, ground to the desired final dimension, and again fired at the final sintering temperature in the neighborhood of 1650° C.

Silver was selected as the metal phase of the cermet largely for its rapid diffusion rates and chemical compatibility mentioned above. Silver was obtained as high-purity, precipitated powder, and was flame sprayed or vacuum deposited on the central areas of the alumina plate.

In preparation of the samples to prove the inventive concept, difficulties were initially experienced in fabricating a satisfactory cermet of a size and uniformity suitable for mechanical testing in available apparatus. Vacuum deposition which was more readily available would not provide adequately thick and coherent films. Due to the volatility of silver at the temperatures used in the diffusion process, it became necessary to mask a $\frac{1}{10}$ inch border around the faces and edges of the alumina plate with collodion. Following the flame spraying with silver, as pointed out above, the decomposed collodion film with a small amount of adherent silver was scraped from the alumina. The removal of the remaining carbonaceous residue was accomplished by heating the sample in air at 400–500° C. A sample thus prepared consisted of $\frac{1}{10}$ inch thick rectangular alumina plates ($\frac{7}{8}''$ wide x $1\frac{7}{8}''$ long) with a 0.003 inch thick film of flame-sprayed silver on the central areas of opposite faces of the plate serving as electrodes.

Referring now to the apparatus illustrated in FIGS. 1–3 for carrying out the inventive method, FIG. 1 shows a tube chamber 10, of Vycor glass for example, positioned in a wire-wound tube furnace 11. Tube 10 is provided with end caps 12 and 13, of stainless steel for example. A pair of O-rings 14 are positioned between tube 10 and each of end caps 12 and 13 to provide a seal therebetween.

End cap 12 is provided with an aperture 15 through which a power lead 16 connects an electrode holder 17 with an external power source (not shown), electrode holder 17 being positioned within tube 10. An O-ring 18 is positioned in a groove in end cap 12 and adjacent aperture 15 to provide a seal around power lead 16. A gas inlet passage 19 is provided in end cap 12 to interconnect the interior or chamber of tube 10 with a source (not shown) of gas, such as argon.

End cap 13 is provided with an aperture through which a power lead 16' extends for connection to an electrode holder 17' positioned within tube 10, lead 16' being operatively connected to a power source (not shown). An O-ring (not shown) is positioned in end cap 13 as described above with respect to O-ring 18. A gas outlet passage 20 is provided in end cap 13 to provide a return to the gas source (not shown) from the interior or chamber of tube 10. A tube or conduit 21 carrying a thermocouple or the like extends through an aperture 22 in end cap 13 and connects with electrode holder 17'. An O-ring 23 is positioned in a groove in end cap 13 and adjacent aperture 22 to provide a seal around thermocouple conduit or tube 21.

A pair of electrodes 24 and 24' extend from holders 17 and 17', respectively. Positioned between electrodes 24 and 24' is a sample 25, more specifically illustrated in FIGS. 2 and 3.

Sample 25 as illustrated in FIGS. 2 and 3, in this embodiment of the apparatus for practicing the invention, constitutes a bar of alumina 26 with a layer or film of silver deposited on each side thereof as described above and indicated at 27, silver electrodes 24 and 24' abutting the layers of deposited silver 27.

Upon completion of the process of the invention at least a portion of the silver 27 is electrodiffused into the alumina bar 26 as indicated at 28 in FIG. 3. As shown diagrammatically by grain structure in FIG. 4, the area indicated at 28 in FIG. 3 comprises a grain boundary indicated at 29 and a grain structure composed of oxygen, silver and aluminum atoms, 30, 31 and 32, respectively.

With a piece of ceramic material having metal deposited thereon, such as sample 25, positioned in the furnace 11 as illustrated in FIG. 1, the temperature is raised to a desired point, for example, 850–900° C., and a D C. potential of 300–400 volts is applied across the electrodes 24 and 24'. A limiting resistor (not shown) is added to the high voltage circuit to protect the sample from local overheating because as the sample's resistance decreases, local breakdown circuits form. Atmospheric control was provided in tests conducted to prove the inventive concept, and fabrication of the cermet was generally done in argon. Since silver oxide decomposes above 150° C. the argon atmosphere was not required except during cooling. The potentials and temperatures used represent limitations of the apparatus utilized and the melting point of the silver (960° C.), respectively. The samples tested were thus treated for 8 to 100 hours.

In order to evaluate the results of the modification of the mechanical nature of a ceramic by diffused metal, modulus of rupture tests were conducted. Samples treated in accordance with the invention, examined in cross-section, showed a definite diffusion zone with a fairly sharp boundary. The position of the boundary was dependent upon time, temperature, and electrode contact. Where pressure was applied to the electrode locally, the shape of the diffusion zone edge clearly reflected the pressure contact area by showing greater penetration of the silver under that spot (see FIG. 3). This was due to the better contact between surfaces, and indicated that vaporization-condensation transfer was rate determining. These tests proved that a definite modification of the strength of a ceramic is produced by the electrodiffusion of a metal therein by the method of applicant's invention.

Applicant's novel ceramic-to-metal bonding method thus produces a cermet having the following advantages: (1) a 10–15% increase in strength over untreated ceramic material; (2) an increase in electrical conduction over untreated ceramic material; and (3) improved thermal shock resistance.

While a specific application of the inventive method and a specific apparatus for carrying out the method have been illustrated and described, modifications and changes will become apparent to those skilled in the art, and it is intended to cover in the appended claims all such modifications and changes as come within the true spirit and scope of the invention.

What I claim is:

1. A method for electrodiffusion of a metal into a ceramic comprising the steps of: preparing the ceramic material composed essentially of alumina, providing a substantially uniformly distributed film of silver on at least two parallelly disposed surfaces of the ceramic material, heating the thus prepared material to a temperature from about 50° C. to 100° C. below the melting point of said silver, directing a voltage across the parallelly disposed surfaces of the prepared heated material having a silver film thereon for substantially uniform diffusion of the silver into one surface of the ceramic material contiguous to the silver film and cooling the thus formed composite material, thereby improving the strength, brittleness, and thermal shock properties of the ceramic.

2. The method defined in claim 1, wherein the prepared material is heated to a temperature in the range between 850 to 900° C.

3. The method defined in claim 2, wherein the voltage is in the range between 300 to 400 volts.

4. The method defined in claim 3, wherein the voltage is of the direct current type.

5. The method for electrodiffusion of a metal into a ceramic material of the oxide type comprising the steps of: providing the ceramic material composed essentially of alumina with a substantially uniformly distributed film of silver about 0.003 inch thick on at least two parallelly disposed surfaces thereof, heating the alumina and silver film to a temperature of about 50 to 100 centigrade degrees below the melting point of the silver and under controlled atmospheric conditions, directing a voltage across the parallelly disposed surfaces of the alumina having a silver film thereon for a time period in the range between about 8 to about 24 hours for substantially uniform diffusion of the silver into one surface of the alumina contiguous to the silver film, and cooling the thus formed composite ceramic-metallic material under controlled atmospheric conditions, thereby improving the strength, brittleness, and thermal shock properties of the ceramic material.

6. The method defined in claim 5, wherein the voltage is of the direct current type.

7. The method defined in claim 5, wherein the temperature utilized is in the range between about 850 to 900° C.

8. The method defined in claim 1, wherein the film of silver is provided on the alumina by utilizing a flame spraying technique.

9. The method defined in claim 1, wherein the film of silver is provided on the alumina by masking a border around the faces and edges of the alumina with collodion, flame spraying with silver, scraping the decomposed collodion film with the adherent silver thereon from the alumina, and removing the remaining carbonaceous residue by heating the alumina-silver assembly in air at 400–500° C.

10. The method defined in claim 3, wherein the voltage is directed across the heated prepared material for a time period in the range of about 8 to 24 hours.

11. The method defined in claim 3, wherein the cooling operation is carried out in an argon atmosphere.

12. The method defined in claim 5, wherein the voltage is in the range between about 300 to about 400 volts.

13. The method defined in claim 5, wherein the film of silver is provided on the alumina by utilizing a flame spraying technique.

14. The method defined in claim 5, wherein the film of silver is provided on the alumina by masking a border around the faces and edges of the alumina with collodion, flame spraying with silver, scraping the decomposed collodion with adherent silver thereon from the alumina, and removing the remaining carbonaceous residue by heating thus prepared alumina-silver assembly in air at 400–500° centigrade.

References Cited

UNITED STATES PATENTS

| | | | |
|---|---|---|---|
| 1,592,429 | 7/1926 | Kraus | 65—30 |
| 2,694,016 | 11/1954 | Craven et al. | 117—123 |
| 2,733,161 | 1/1956 | Lytton et al. | 117—123 |
| 2,927,042 | 3/1960 | Hall et al. | 117—123 |
| 2,861,900 | 11/1958 | Smith et al. | 117—105.2 X |
| 3,177,134 | 4/1965 | Gartner et al. | 117—5.5 X |
| 3,179,535 | 4/1965 | Comtois | 117—212 X |

RALPH S. KENDALL, *Primary Examiner.*

H. COHEN, *Assistant Examiner.*